United States Patent
McAllister et al.

(10) Patent No.: US 7,467,404 B2
(45) Date of Patent: Dec. 16, 2008

(54) SYSTEM AND METHOD FOR DISTRIBUTING SOFTWARE LICENSES

(75) Inventors: Lawrence McAllister, Las Vegas, NV (US); James W. Morrow, Sparks, NV (US); Marvin A. Hein, Jr., Las Vegas, NV (US)

(73) Assignee: Bally Garning, Inc., Las Vegas, NV (US)

( * ) Notice: Subject to any disclaimer, the term of this patent is extended or adjusted under 35 U.S.C. 154(b) by 170 days.

(21) Appl. No.: 10/951,954

(22) Filed: Sep. 27, 2004

(65) Prior Publication Data

US 2006/0073890 A1    Apr. 6, 2006

(51) Int. Cl.
   *H04L 9/32*    (2006.01)
(52) U.S. Cl. ............................................ 726/9; 463/29
(58) Field of Classification Search ..................... 726/9; 713/178; 463/29
   See application file for complete search history.

(56) References Cited

U.S. PATENT DOCUMENTS

| | | | |
|---|---|---|---|
| 5,138,712 A | 8/1992 | Corbin | |
| 5,386,369 A | 1/1995 | Christiano | |
| 5,826,011 A | 10/1998 | Chou et al. | |
| 6,023,763 A | 2/2000 | Grumstrup et al. | |
| 6,226,747 B1 | 5/2001 | Larsson et al. | |
| 6,264,561 B1 | 7/2001 | Saffari et al. | |
| 6,788,800 B1* | 9/2004 | Carr et al. ................... | 382/100 |
| 6,857,067 B2* | 2/2005 | Edelman ..................... | 713/155 |
| 2001/0013099 A1 | 8/2001 | Haruki | |
| 2002/0112176 A1 | 8/2002 | Murray | |
| 2003/0134675 A1* | 7/2003 | Oberberger ................... | 463/29 |
| 2004/0267590 A1* | 12/2004 | Clark et al. ..................... | 705/9 |
| 2005/0015275 A1* | 1/2005 | Takekawa et al. .............. | 705/1 |
| 2005/0138387 A1* | 6/2005 | Lam et al. .................... | 713/185 |
| 2005/0165693 A1* | 7/2005 | Moritzen ..................... | 705/59 |
| 2005/0251488 A1* | 11/2005 | Saunders et al. .............. | 705/59 |

* cited by examiner

*Primary Examiner*—Andrew L Nalven
(74) *Attorney, Agent, or Firm*—Vanessa J. Owen; J.P. Cody (57) ABSTRACT

A method for distributing software licenses for authorizing the installation of gaming software, by a user, onto a gaming machine is provided. The software installation process is initiated and an electronic key containing an encrypted license count interfaces with the gaming machine. The encrypted license count represents the number of licenses available for authorizing the installation of a particular gaming software. The encrypted license count is accessed and it is determined whether installation is permitted. Additionally a processing means for accessing a remote server, via a network connection, and increasing the licensing count stored in the electronic key is provided.

44 Claims, 4 Drawing Sheets

SYSTEM AND METHOD FOR DISTRIBUTING SOFTWARE LICENSES

BACKGROUND OF THE INVENTION

The invention generally relates to a system and method for distributing software licenses, and more particularly, to a system and method for distributing software licenses for a gaming machine via an electronic key.

Traditionally, gaming software is stored and sold on a data storage device such as a CD-ROM, EPROM or hard disk drive. Each of these forms of storage media may be duplicated using commercially available copying equipment. It is therefore possible for a customer to purchase one physical software package and to install the game onto multiple machines, thus allowing the customer multiple uses of the game even though the customer only has paid for the one game copy.

Accordingly, software companies have developed various security measures to prevent the use of unpaid software. One such measure requires the user to have a valid software license before each installation is authorized. For example, if a customer wants to run four installations of a game, the customer would purchase one software package and four software licenses. This allows the customer to install four instances of the gaming software onto different gaming machines.

In this regard, various devices and methods have been used to distribute software licenses. For example, some software licenses utilize a unique code that is associated with a specific software package. During the installation process, the user is prompted to enter the unique code. If a valid code is entered, then the installation is permitted to proceed.

However, as technology has advanced, these methods have become less secure. Therefore, another solution requires a valid physical hardware device be connected to a game during the installation process. If the appropriate hardware device is not connected to the gaming machine, then installation of the software is denied. Typically, the hardware device stores a preset number of software licenses. For each instance of software installation, the preset number is decreased. Once the preset number equals zero, then additional installations are denied, even if the hardware device is attached to the gaming machine. In some cases, the hardware device may be physically taken to a remote location to upgrade the device so as to add an additional number of software licenses. However, this is neither a convenient nor a time efficient method for updating an expired license count, and therefore, is not an effective method for distributing software licenses.

One device extremely useful in distributing software licenses is an electronic key. Electronic keys are small and robust. Additionally, they provide a very secure means for storing data and therefore are useful in preventing the unauthorized duplication and use of gaming software. It is very difficult to break into an electronic key and to tamper with the contents stored within the memory of the electronic key. Due to the high level of security provided by an electronic key, it is desirable to use the key as a means for storing software licenses.

However, once all of the licenses stored on an electronic key have been distributed, the key user must order more keys and wait for them to be delivered, which impedes the sale of additional software licenses. In a casino or other mass-installation environment, it is advantageous to be able to quickly adjust the number of licenses purchased in order to meet the dynamic needs of the customer.

What is needed, therefore, is an effective and efficient means for updating and refreshing the license count stored on such electronic keys, wherein the same electronic keys are used to securely transfer and distribute software licenses.

SUMMARY OF THE INVENTION

Briefly, and in general terms, there is provided a system and method for utilizing an electronic key to distribute software licenses. More particularly, there is provided a method and system for more efficiently updating the expired count on such electronic keys.

One embodiment of the invention, provides a method for distributing software licenses for authorizing the installation of gaming software, by a user, onto a gaming machine. The method comprises initiating the process of installing gaming software, and then interfacing with an electronic key, wherein a user connects the electronic key to an electronic key receptor connected to the gaming machine, and wherein the electronic key contains an encrypted license count stored therein. The encrypted license count represents the number of licenses available for authorizing the installation of a particular gaming software. A main processor accesses and decrypts the encrypted license count stored on the electronic key. The value of the decrypted license count is evaluated to determine whether installation of the gaming software is authorized.

If the license count is one or more, the main processor decrements the license count by one, re-encrypts the license count value and then authorizes the installation of the software onto the gaming machine to proceed. If, however, the decrypted license count is zero, the installation of the software on the gaming machine is denied and the user is provided with the opportunity to apply for one or more additional licenses by accessing a remote server, via a network connection. Specifically, the user is provided with a processing means for accessing the remote server and increasing the license count stored on the electronic key.

Optionally, in another embodiment, the origin of the electronic key is authenticated before the main processor accesses the encrypted license count. Additionally, in an optional embodiment, the information stored on the electronic key is validated before the main processor accesses the encrypted license count.

In another embodiment of the invention, the user is provided with the opportunity of connecting the electronic key to the remote server regardless of whether installation of the gaming software is authorized.

In a separate embodiment of the invention, if the decrypted license count is one or more, the license information stored in the electronic key is distributed to a data vault connected to the gaming machine. The license information stored in the data vault includes license expiration data for triggering the deactivation of installed software upon the expiration of the software license.

In another embodiment, after authorizing the installation of software, the gaming software is transferred via a transport medium to the gaming machine. The transferred gaming software is then installed onto the gaming machine.

Additionally, one embodiment of the invention further comprises connecting the electronic key to the remote server and receiving one or more licenses for authorizing the installation of software upgrades applicable to particular gaming software.

In another embodiment of the invention, the electronic key is limited for use with one or more particular gaming machines and is only authorized to communicate with these particular gaming machines.

In another embodiment, the processing means connects to the remote server via the Internet. Optionally, however, the processing means connects to the remote server via a network system not associated with the Internet.

Another embodiment provides a system for distributing gaming software licenses. The system comprises a gaming machine for playing electronic wagering games, an electronic key, an electronic key receptor, a main processor and a processing means for accessing a remote server. The electronic key stores an encrypted license count indicating the number of software licenses available for the installation of gaming software. The electronic key receptor is operatively connected to the gaming machine and acts as an interface for communicating with the electronic key. The main processor accesses the encrypted license count stored on an electronic key and determines whether installation of the gaming software is authorized based upon the value of the license count. The license count must be greater than zero to authorize the installation. The processing means interfaces with the electronic key via the electronic key receptor and connects to a remote server via a network connection. The processing means accesses the remote server and increases the license count stored on the electronic key.

In another embodiment of the invention, the main processor comprises one or more components for managing various functions of the license distribution system. Examples of such components include, but are not limited to a retrieval component for accessing the encrypted license count when the electronic key interfaces with the electronic key receptor; a decryption component for deciphering the license count; and an evaluation component for evaluating the deciphered license count and determining whether a software license is available, and if a software license is available then transferring the software license to the gaming machine and decrementing the software count by one.

Optionally, in a separate embodiment the license count stored on the electronic key is not encrypted and the system does not utilize a decryption component. Additional examples of components include a re-encryption component for re-encrypting the decremented license count; an authentication component for authenticating the origin of the electronic key and a validation component for validating the electronic key.

In another different embodiment, the processing means comprises the main processor accessing the remote server via the network connection and communicating with the electronic key via the electronic key receptor. Alternatively, in a different embodiment, the processing means comprises a second processor accessing the remote server via the network connection, and communicating with the electronic key, the second processor being connected to the gaming machine. Additionally, the second processor communicates with the electronic key via the electronic key receptor. Optionally, in an alternative embodiment, the second processor comprises a second electronic key receptor for communicating with the electronic key and the second processor does not communicate with the electronic key via the first electronic key receptor.

In another embodiment, the processing means comprises a second processor, separate from the gaming machine, having a second key receptor for communicating with the electronic key, wherein the second processor accesses the remote server via the network connection and the second processor is not connected the gaming machine.

Additionally, in another different embodiment, a data vault is mounted within the gaming machine. Software license information is distributed from the electronic key to the data vault for storage. Optionally, the data vault provides an added measure of security.

These and other features and advantages of the present invention will become apparent from the following detailed description, taken in conjunction with the accompanying drawings, which illustrate by way of example, the features of the present invention.

DETAILED DESCRIPTION OF THE INVENTION

The invention is directed to a system and method for distributing software licenses. The system and method provide a more efficient way of updating the number of software installations authorized by an electronic key. Embodiments of the system and method are illustrated and described herein, by way of example only, and not by way of limitation.

In one embodiment, a system for distributing gaming software is provided to be utilized in conjunction with electronic keys. Generally, a software license is associated with a particular software program. The software license is a type of security feature utilized to prevent and limit the unauthorized installation of software. Typically, for multiple installations of the same game, a separate license is required for each installation. The license permits or authorizes the installation to proceed. Additionally, a license can be used to authorize the activation of software that has already been installed.

Referring now to the drawings, wherein like reference numerals denote like or corresponding elements throughout the drawings, and more particularly to FIGS. 1-4, there is shown a system for distributing software licenses.

Figure 1:
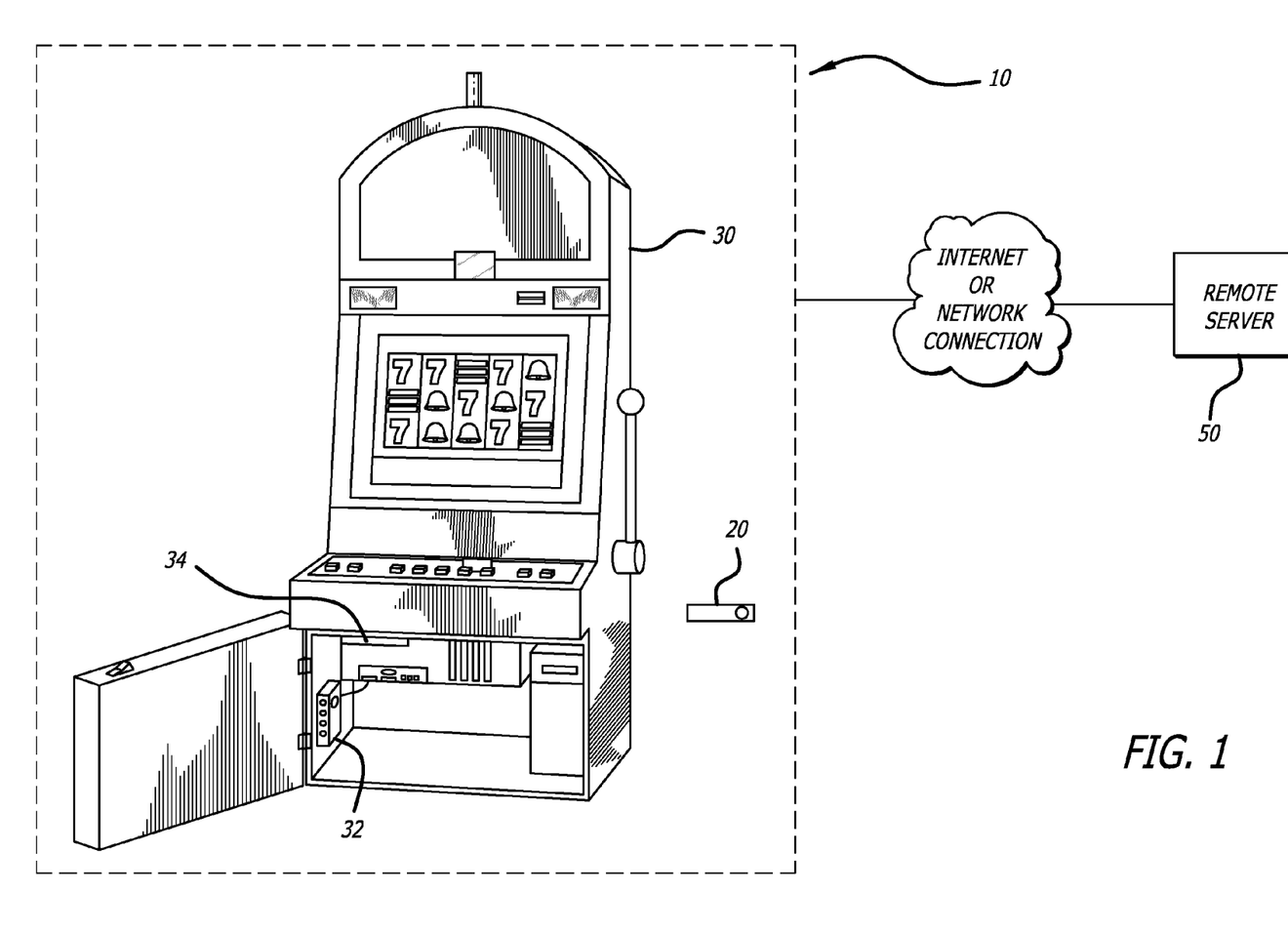
FIG. 1 is a schematic illustration of a system for distributing software licenses in accordance with an embodiment of the invention.

Referring particularly to FIG. 1, a system 10 for distributing software licenses stored on an electronic key is shown. Specifically, the electronic key 20 is provided for storing information, including gaming software information. The electronic key 20 is a small, portable hardware device having a memory chip that communicates by touching the electronic key to an electronic contact point. Each key contains an unalterable and unique address which allows authorization of the key. Additionally, the address can be used to make a unique encryption key when writing data to the memory of the electronic key 20. One example of an electronic key 20 compatible for use with an embodiment of the invention is the iButton® made by Maxim/Dallas Semiconductor Corporation. Of course, one of ordinary skill in the art will appreciate that different types of electronic keys may also be used.

A license count is stored on the electronic key 20. The license count is a value representing the number of available software licenses for a particular software program. A software license is required to authorize the installation of a software program on a gaming machine 30. To begin the installation process, a user connects the electronic key 20 to an electronic key receptor 32. The electronic key receptor 32 is operatively connected to the gaming machine 30 and is a contact point for interfacing with the electronic key 20.

The user may connect the electronic key 20 to the electronic key receptor 32 by simply touching the key to the electronic key receptor. Alternatively, in a different embodiment, the electronic key 20 and electronic key receptor 32 must become temporarily attached to establish a connection. Optionally, in a separate embodiment, the electronic key may be wirelessly connected to the electronic key receptor. Additionally, in an alternative embodiment, the electronic key is connected to the electronic key receptor by inserting the electronic key 20 into the electronic key receptor 32.

The connection between the electronic key 20 and receptor 32 allows the transmission of data between the two devices. A main processor 34 is operatively connected to the gaming machine 30 and accesses the data transmitted from the electronic key 20. The main processor 34 may first authenticate the electronic key 20. Then, the main processor 34 accesses the license count stored on the electronic key 20. In one embodiment of the invention, the stored license count is not encrypted.

In an alternative embodiment of the invention, the license count is stored on the electronic key 20 as an encrypted license count. The main processor 34 accesses and decrypts the encrypted license count. Alternatively, in an optional embodiment a decryption component (not shown) is operatively connected to the gaming machine 30, and is responsible for the decryption of the encrypted license count.

Referring back to FIG. 1, the main processor 34 evaluates and verifies the decrypted license count to determine whether or not to permit or authorize the installation of the software.

If the value of the license count is one or more, the main processor authorizes the installation of the gaming software onto the gaming machine 30. The license count is decremented by one and then the count is re-encrypted. This updated license count is then stored on the electronic key 20.

If the value of the license count is zero, then the main processor 34 denies the installation of the gaming software onto the gaming machine 30 and the user is offered the opportunity to connect to a remote server and update the expired license count.

In an alternative embodiment, both a license count and a maximum license count value are stored in the electronic key. The maximum license count value is a fixed value representing the total or maximum number of licenses authorized for use. The license count is a changeable value representing the number of software licenses that have already been used to permit software installation. During the installation process, the main processor 34 determines whether or not to permit the software installation by comparing the license count to the maximum license count value. If the value of the license count is less than the maximum license count value, the main processor 34 authorizes the installation of the gaming software onto the gaming machine 30. The value of the license count is then incremented by one and the incremented license count is stored in the electronic key 20.

If the value of the license count is equal to the maximum license count value, then zero licenses are available and the main processor 34 denies the installation of the gaming software onto the gaming machine 30. The user is then offered the opportunity to access a remote server and update the information stored in the electronic key so that additional software installations can be authorized. For example, in an electronic key having a maximum license count value of ten, the license count value is incremented by one each time a license is used. Once the license count equals ten, (i.e. the maximum license count value), then zero software licenses are available. A user may then access a remote server and add additional licenses to the electronic key.

A processing means provides access the remote server 50. The processing means connects to the remote server via a network connection. Additionally, the processing means includes a contact point for communicating with the electronic key 20. The remote server 50 connects to a software license distribution site which enables the user to increase the license count stored on an electronic key 20 in communication with the processing means. The remote server 50 is located separate and apart from the gaming machine 30. Additionally, in alternative embodiments, the remote server 50 also enables the user to update other information stored on the electronic key 20. Such information may include, but is not limited to, time duration for demo software and different game licenses. Optionally, the electronic key may store information pertaining to the sale of gaming software, including the identification (ID) of the software product(s) purchased, the number of licenses purchased, the authentication security features that prevent duplication and modification of the electronic key, and the time duration of the licenses. Additionally, any type of data may be stored as information in the electronic key.

In one embodiment of the invention, the processing means for providing access to a remote server comprises the main processor 34, wherein the main processor connects to the remote server 50 via a network connection. The electronic key receptor 32 is connected to the main processor 34 and serves as the contact point for transmitting communications between the main processor 34 and the electronic key 20. Referring to FIG. 1, the user connects the electronic key 20 to the electronic key receptor 32, which is connected to the main processor 34. The main processor 34 accesses the remote server 50, via a network connection, and requests a license count increase on the electronic key 20. Once the license count increase is granted, the main processor accesses the electronic key, and the license count stored in the electronic key is updated to reflect the newly increased license count.

Figure 2:
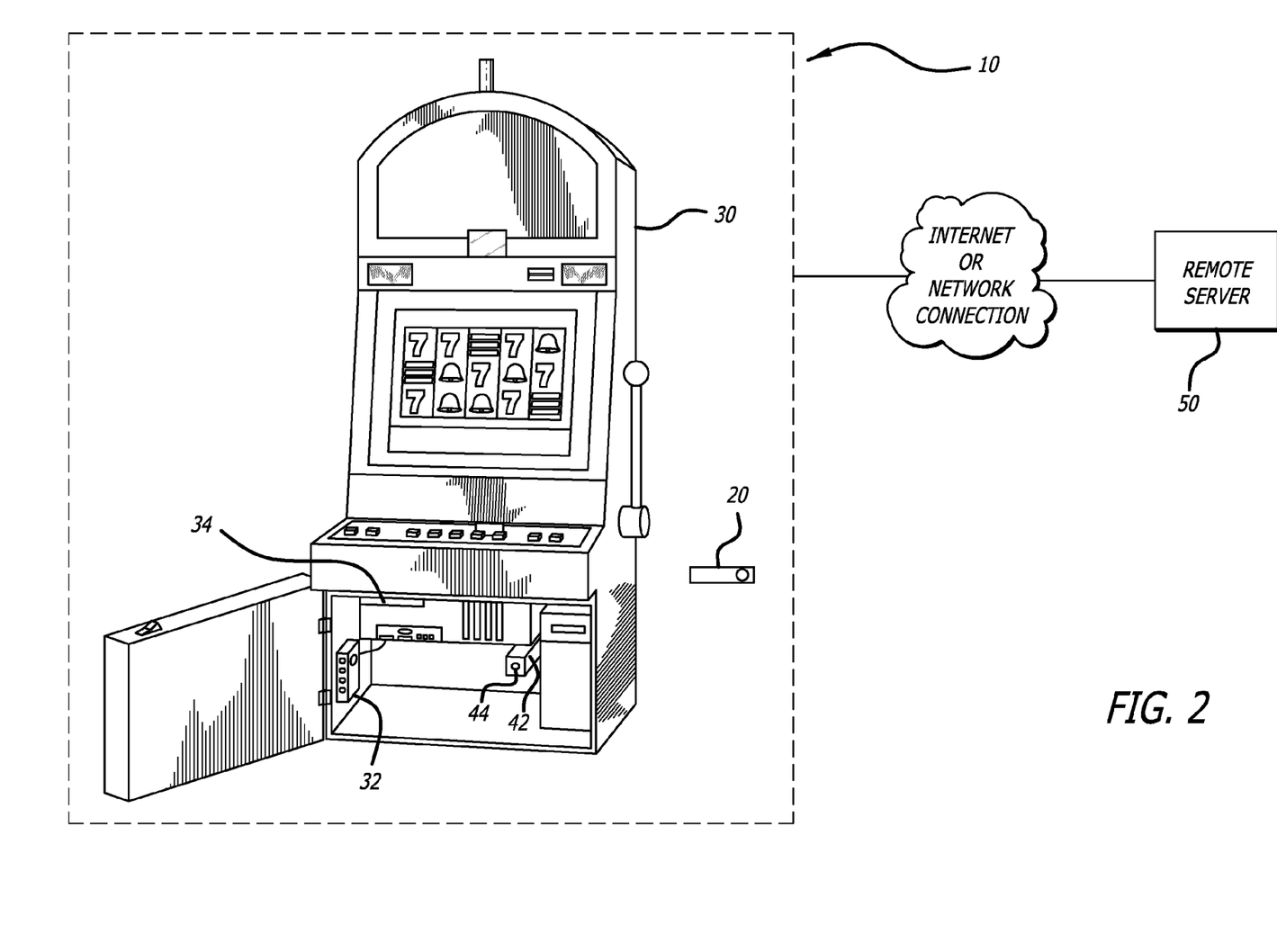
FIG. 2 is a schematic illustration of a system for distributing software licenses in accordance with another embodiment of the invention.

In an optional embodiment of the invention, the processing means for accessing a remote server comprises a second processor connected to a remote server, wherein the main processor is separate from the second processor and the main processor is not connected to the remote server. Referring to FIG. 2, a second processor 42, separate from the main processor 34, is connected to the remote server 50 via a network connection. An electronic key receptor 44 is connected to the second processor 42 and serves as a contact point for transmitting communications between the second processor 42 and the electronic key 20. For example, if a user wants to access the remote server 40, the user connects the electronic key 20 to the electronic key receptor 44. The second processor 42 accesses the remote server 50 and requests an increase in the license count stored on the electronic key 20. Once the license increase is granted, the second processor accesses the electronic key 20 via the interface provided by the electronic key receptor 44 and updates the electronic key 20 accordingly.

Alternatively, in a different embodiment, the electronic key receptor 32 is connected to both the main processor 34 and the second processor 42. The electronic key receptor 32 servers as the one contact point for interfacing an electronic key 20 with either the main processor 34 or the second processor 44.

Figure 3:
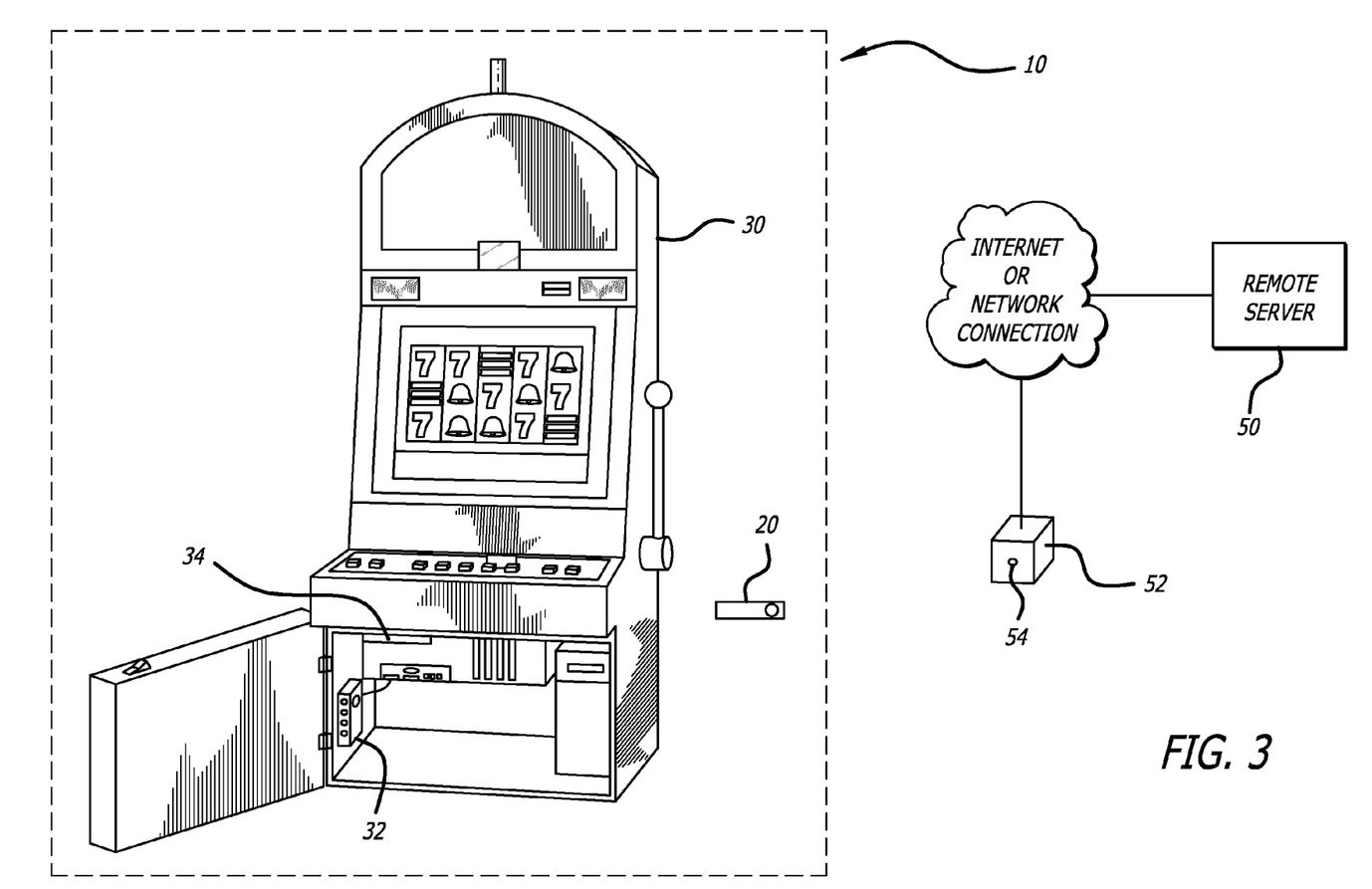
FIG. 3 is a schematic illustration of a system for distributing software licenses in accordance with another embodiment of the invention.

Optionally, in an alternative embodiment of the invention, the processing means for accessing a remote server comprises a second processor separate from the gaming machine. Referring to FIG. 3, a separate second processor 52 is not operatively attached to the gaming machine 30. The second processor 52 is connected to the remote server via a network connection. Additionally, the second processor includes an electronic key receptor 54 for interfacing with an electronic key. For example, if a user wants to access the remote server, the user connects the electronic key 20 to the electronic key receptor 54 and the second processor 52 accesses the remote server 50 via the network connection. The second processor 52 can request an information update for the information stored in the electronic key, including the license count information. Once the second processor receives the update, the second processor accesses the electronic key 20 and updates it accordingly.

In a different embodiment of the invention, the network connection for accessing the remote server is an Internet connection.

Once the processing means accesses the remote server 50, the user may update the expired license count on the electronic key. Optionally, the user may access the remote server 50, via the processing means, even if the license count stored on the electronic key 20 has not expired. In that case, the user may simply increase the already existing license count. Alternatively, the user may connect to the remote server 50 to update other information stored on the electronic key 20. Again, such information may include, but is not limited to, time duration for demo software and different game licenses.

Figure 4:
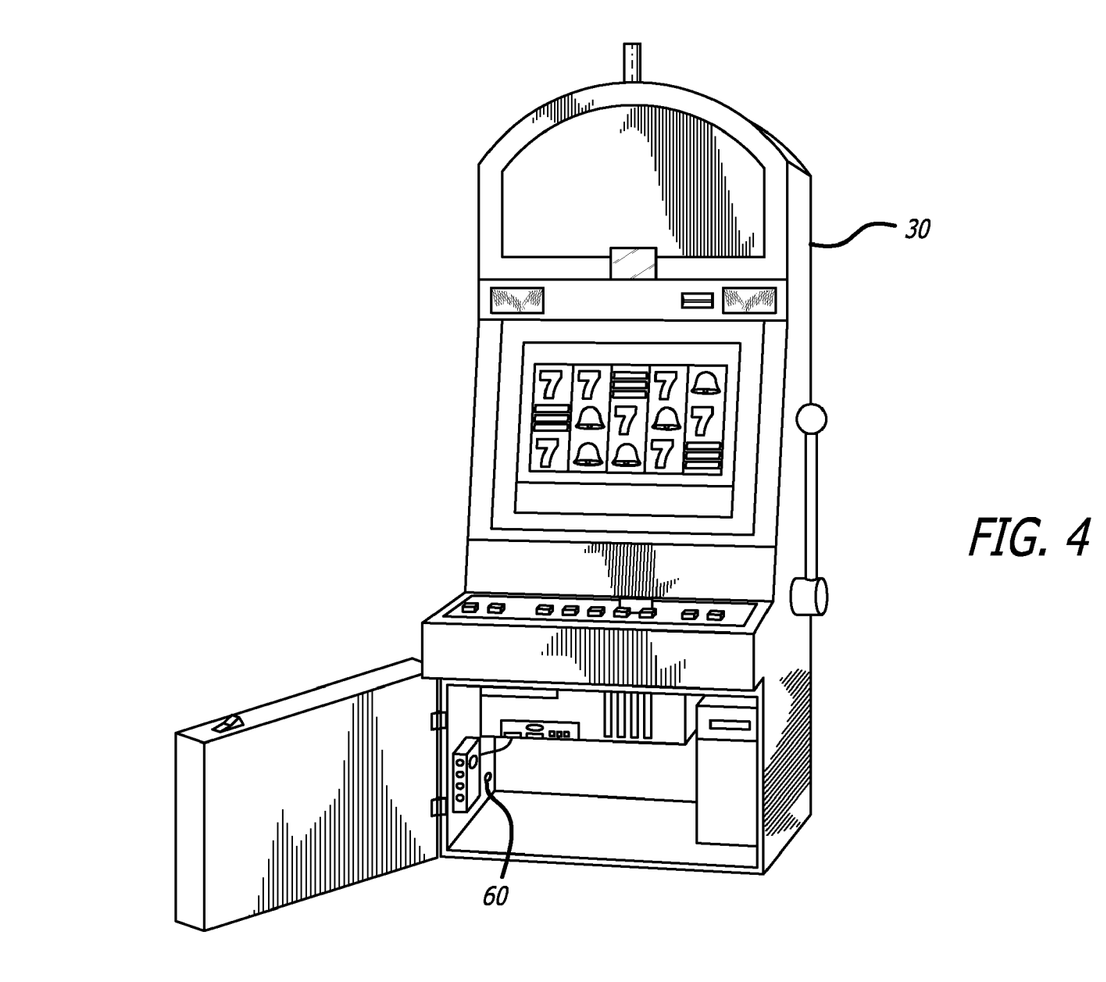
FIG. 4 is an illustration of a gaming machine for use in accordance with an alternative embodiment of the invention.

In another optional embodiment of the invention, if the value of the license count is one or more, the main processor 34 authorizes the installation of the gaming software onto the gaming machine 30, decrements the license count by one, re-encrypts the decremented license count, and then distributes a software license to the gaming machine 30. Referring to FIG. 4, a gaming machine 30 includes a data vault 60 for storing software licenses. Optionally, the data vault 60 stores other information including software license information. The software license information can be accessed by the main processor to verify the existence of a license for the software game. For example, if the value of the license count on the electronic key 20 is one or more, licensing information from the electronic key 20 is stored in the data vault 60 as a permanent record that the software is legal. Upon each boot of the gaming machine 30, the licensing information stored in the data vault 60 serves as an activation code to activate the installed software. Without such an activation code the software is not activated on the gaming machine 30.

The data vault 60 is provided for securely storing information, including software licenses and gaming software information. Additionally, the data vault 60 is designed to be used in conjunction with the electronic key 20. One example of a data vault 60 compatible for use with an embodiment of the invention is the iButton® made by Maxim/Dallas Semiconductor Corporation. Of course, one of ordinary skill in the art will appreciate that different types of small, mountable memory devices may also be used.

Additionally, in another embodiment of the invention, the licensing information stored in the data vault 60 includes license expiration data. Some software is designed to expire after a pre-determined passage of time, or after a pre-determined number of uses. License expiration data stored in the data vault 60 can trigger the deactivation of installed software once the license has expired.

In another embodiment of the invention, once the software installation has been authorized, the user may then transfer the gaming software via a transport medium to the gaming machine 30. Examples of a transport medium include a CDROM, an EPROM and DVD, a hard drive, a floppy disk, a USB flash module or the like. Alternatively, the transport medium could include a network connection, wherein the gaming software is transferred to the gaming machine 30 through the network connection. Once the software has been transferred to the gaming machine 30, the installation may proceed.

In an alternative embodiment of the invention, the user may access the remote server 50 at any time. For example, the user may access the remote server 50 prior to initiating the installation process.

In one embodiment, the electronic key 20 can be associated with specific gaming software and limited for use with only that software. Optionally, the electronic key 20 can be associated with a particular category of games and limited for use with only that particular category. The games can be organized into categories according to game theme, game type (such as poker type games or keno type games), game title, game family or any other category as defined and chosen by the game manufacturer.

Additionally, the electronic key 20 can be associated with a specific gaming machine 30 and limited for use with only that machine. Alternatively, the electronic key 20 can be associated with a specific group of gaming machines. For example, gaming machines can be divided into groups according to a particular customer, model number, sales order number, or jurisdiction.

In another embodiment of the invention, the main processor 34 comprises one or more components (not shown) for managing various functions of the system 10. Examples of such components include, but are not limited to a retrieval component for accessing the encrypted license count when the electronic key interfaces with the electronic key receptor, a decryption component for deciphering the license count and an evaluation component for evaluating the deciphered license count and determining whether a software license is available. Additionally, if the evaluation component determines a software license is available, then a software license is transferred to the gaming machine 30 and the license count is decremented by one. Further, the main processor 34 may additionally comprise a re-encryption component for re-encrypting the decremented license count, an authentication component for authenticating the origin of the electronic key, and a validation component for validating that the electronic key had not been altered or duplicated.

In one embodiment of the invention, both the electronic key 20 and the data vault 60 are authenticated by the gaming machine 30 to establish that origin of the devices and to ensure that the devices are not counterfeit. In another embodiment, the validation component examines both the electronic key 20 and the data vault 60 to ensure that neither has been altered or duplicated.

In another embodiment of the invention the electronic key 20 may be revoked if it is lost or stolen. Optionally, once an electronic key has been revoked, it cannot be enabled and used again. In one optional embodiment, the electronic key 20 is designed with various security levels. For example, a gaming regulator or casino operator may revoke an electronic key 20. Casino technicians can view a listing of electronic keys and the status of the keys, but cannot revoke the electronic key 20.

One example of a system for distributing software licenses in accordance with an embodiment of the invention is described as follows. However, the following is merely one example and is not meant to limit the invention.

In this example embodiment, the electronic key 20 is comprised of a Dallas SHA iButton®, part number DS1963S, held in a plastic key fob, Dallas part number DS9093A or equivalent. The plastic key fob carrier is available in red, yellow, green, blue and black. Colored carriers are used to signify different levels of access, for easy identification within the casino. Initially, each electronic key 20 is hard coded into one of three security access levels. For example, green carriers will signify the lowest security access level, yellow will signify medium access, and red will signify the highest level.

The SHA iButton® is a small self-enclosed device, packaged in a round stainless steel case resembling a small camera battery, measuring about 17 mm in diameter and 6 mm thick. It contains 4 Kbits of battery backed RAM memory, a unique 48-bit serial number (ESN) and a SHA engine, which can be used for electronic key authentication as well as validation of the electronic keys' data contents. Additional specification data pertaining to the SHA iButtons used in the above example may be found in the published Dallas Semiconductor Application Note 157 entitled 'SHA iButton® API Overview' attached as Appendix A, and is incorporated by reference.

The electronic key 20 interfaces with the gaming machine 30 via an electronic key receptor 32, located inside the gaming machine. Due to the cryptographic security features of the electronic key 20, the electronic key receptor 32 may be located anywhere inside the locked outer door of the machine, and the interface wiring does not require physical security. The electronic key interface (i.e. the electronic key receptor 32) is not vulnerable to eavesdropping attacks.

In order to effectively authenticate electronic keys and their contents, the gaming machine must share a secret with the electronic key. This secret must be programmed into both the host machine and the electronic key such that the machine can send the electronic key a random value, called a challenge, and ask the electronic key to perform a SHA1 calculation on that challenge combined with its secret and, optionally, a portion of its data. Since the machine knows the challenge and the secret, and can read the electronic key's data, it can perform its own SHA1 calculation and compare the resulting MAC (Message Authentication Code) with that generated by the electronic key. Furthermore, since the machine changes its random value for each challenge, an observer cannot record the transaction and play it back to trick the process.

In the authentication scenario described above the gaming machine must contain a system-wide secret. Since discovery of that secret would compromise the security of every machine produced and since it is difficult to conceal information stored in a gaming machine's storage media, the secrets may instead be stored in a secondary SHA iButton®, called a data vault, located inside the gaming machine. Once programmed into the SHA iButton®, the physical and logical security features of the SHA iButton® render the secrets virtually immune to attack. Furthermore, this secondary SHA iButton®, (i.e. the data vault) can serve as a SHA coprocessor, computing MACs on behalf of the gaming machine, using the secrets that are shared with the roving electronic key.

Using the data vault as a coprocessor, the gaming machine can authenticate an electronic key by asking both the electronic key and the coprocessor to calculate a MAC using the same user data, the same random challenge, and the same secret. If the results match then the electronic key is authentic.

The data vault 60 can be mounted permanently inside the stationary portion of the locked logic compartment of the gaming machine.

Upon authenticating the electronic key, the gaming machine determines the security level of the electronic key and then displays a diagnostic screen showing a list of allowed functions. For example the list of functions may include but is not limited to the following: clear safeRAM, reset bindings (in the event that a sensitive component fails or needs to be replaced), install software & upgrades to the hard drive via CDROM, access the event log database on the hard drive, verify software and/or firmware, change pay tables, and download software over the network or external source.

An optional audit log provides a record of all transactions performed. All gaming machine transactions are temporarily stored in the electronic key until uploaded into a PC database. Data stored includes, but is not limited to: function type (safeRAM clear, software install, etc.), machine ID (48 bit unique digital ID), date the function was performed, and time the function was performed.

The gaming machine authenticates the origin of each electronic key and refuses service to any electronic key that fails the authentication test. Each electronic key contains a unique authentication secret different from the property-wide authentication secret contained in the data vault. This electronic key authentication secret is computed using a property-wide authentication secret, along with the initialization information stored in the electronic key and the electronic key's unique 48-bit ESN. The property-wide authentication secret is programmed into every data vault used in a specific property, and is the same for every machine sold to that property. The electronic key authentication secret that is programmed into each electronic key, however, is unique to each individual electronic key, and is bound to that electronic key's ESN. In the event that an electronic key's secret is discovered, it will reveal nothing about how to make other electronic keys.

Since all of the information that comprises the electronic key authentication secret is known to, or can be read by, the data vault, the data vault can calculate the electronic key's secret at the request of the game, and then use the electronic key's secret to compute MACs for comparison to those generated by the electronic key itself. During the authentication process, the game software reads the ESN and initialization information from the roving electronic key and writes it to the data vault. It then asks the data vault to compute the electronic key's authentication secret from this information combined with the property-wide authentication secret which the data vault already knows. Once the electronic key's authentication secret is calculated, the machine asks the data vault to run a SHA1 calculation using the electronic key's authentication secret and the random challenge which was sent to both the electronic key and the data vault. The resulting MAC is then compared to that generated by the electronic key to determine authenticity.

The gaming machine validates the data contained in each electronic key and refuses service to any electronic key that fails the validation test. Electronic key data is protected by embedding, with the electronic key, a signature generated by the data vault. The data vault generates each signature by running a SHA calculation over the system signing secret (installed in the data vault during factory initialization) combined with the electronic key's unique ESN, the data page number, the page's write counter value, and the data itself. Upon reading data from an electronic key, the data vault imports this set of data from the electronic key and runs it through the SHA calculation. The resulting MAC is then compared to the signature that was embedded with the data in the electronic key. If they match, then the data is valid.

The gaming machine verifies that the gaming machine and the electronic key belong to the same property, and to refuses service to any electronic key which belongs to a different property.

The gaming machine determines the version level of each electronic key in order to confirm compatibility with added features or to revoke use of obsolete electronic keys in the event that security policies change.

Additionally, an audit log enables slot management to easily record and track machine security operations. It provides a means to identify all transactions performed while an electronic key is checked out by a technician, as well as a permanent record of operations performed on each machine. Each electronic key contains data space for a minimum of 50 transaction records. As each electronic key's event log becomes full, the contents of the log is be uploaded into a PC database. The PC interfaces with the electronic key via a standard serial port, using an electronic key receptor (such as the iButton° probe manufactured by Dallas Semiconductor, ref Dallas part DS1402D-DR8).

If an electronic key's audit log becomes full before it is uploaded to the database, the gaming machines refuse service to that electronic key. In this event, the machine displays an on-screen message indicating that access to secure functions is denied until the electronic key is uploaded and cleared. The enabling or disabling of the audit log feature is accomplished by configuring an options register contained in each electronic key's memory.

Optionally, in an alternative embodiment, the data vault stores software licenses but does not store or hold the secret that is shared with the electronic key. Instead, the secret is encoded directly into the gaming software.

In view of the above, a more convenient and efficient electronic key, capable of quick and easy updating via a network or the Internet, has been shown and described.

Furthermore, the various methodologies described above are provided by way of illustration only and should not be construed to limit the invention. Those skilled in the art will readily recognize that various modifications and changes may be made to the present invention without departing from the true spirit and scope of the present invention. Accordingly, it is not intended that the present invention be limited, except as by the appended claims.

What is claimed is:

1. A method for distributing software licenses onto a gaming machine, the method comprising:
providing a first electronic key having a memory, a unique serial number and a SHA engine;
providing a gaming machine having a data vault housed within a cabinet of the gaming machine, wherein the data vault is a secondary electronic key comprising a memory, a unique serial number and a SHA engine, and wherein the data vault serves as a SHA coprocessor, and the data vault stores a system wide authentication secret;
interfacing with the first electronic key via an electronic key receptor operatively connected to the gaming machine, wherein the first electronic key stores information including a unique secret authentication key and an encrypted license count, and wherein the encrypted license count represents the number of licenses available for authorizing the installation of the gaming software onto the gaming machine;
authenticating the first electronic key by requesting the first electronic key and the data vault to each calculate a message authentication code and then comparing the resulting calculated message authentication codes;
accessing and decrypting the encrypted license count stored on the first electronic key, if the first electronic key is authenticated; and
if the license count is greater than zero, distributing a license from the first electronic key to the data vault located in the gaming machine, wherein distributing the license includes decreasing the license count on the first electronic key by one and increasing the license count on the data vault by one.

2. The method of claim 1 further comprising, allowing for the installation of gaming software onto a gaming machine if the license count in the data vault is at least one.

3. The method of claim 1 further comprising, before accessing the encrypted license count, validating the information stored in the first electronic key.

4. The method of claim 1 further comprising denying the installation of the software onto the gaming machine.

5. The method of claim 1, further comprising accessing a remote server to increase the license count stored in the first electronic key.

6. The method of claim 1, further comprising checking the data vault for a license at boot up of the gaming machine to activate software on the gaming machine.

7. The method of claim 1, wherein the information stored in the first electronic key includes license expiration data for triggering the deactivation of installed software upon the expiration of the software license.

8. The method of claim 1, further comprising transferring the gaming software from a transport medium to the gaming machine.

9. The method of claim 1, further comprising downloading gaming software onto the gaming machine.

10. The method of claim 9, further comprising installing the downloaded software onto the gaming machine.

11. The method of claim 1, further comprising limiting the first electronic key for use with one or more specified gaming machines.

12. A method for distributing software licenses to authorize the installation of gaming software onto a gaming machine, the method comprising:
providing an electronic key having a memory, a unique serial number and a SHA engine;
providing a gaming machine having a data vault housed within a cabinet of the gaming machine, wherein the data vault is a secondary electronic key comprising a memory, a unique serial number and a SHA engine, and wherein the data vault serves as a SHA coprocessor, and the data vault stores a system wide authentication secret;
interfacing with the first electronic key via an electronic key receptor operatively connected to the gaming machine, wherein the first electronic key stores information including a secret authentication key and a license count, and wherein the license count represents the number of licenses available for authorizing the installation of gaming software onto the gaming machine;
authenticating the first electronic key by requesting the first electronic key and the data vault each calculate a message authentication code, and then comparing the calculated message authentication codes;
accessing the information stored on the first electronic key, and
if the license count is greater than zero, distributing a license from the first electronic key to the data vault located in the gaming machine, wherein distributing the license includes decreasing the license count on the first electronic key by one and increasing the license count on the data vault by one.

13. The method of claim 12 further comprising, allowing for the installation of gaming software onto a gaming machine if the license count in the data vault is at least one.

14. The method of claim 12 further comprising, validating the information stored on the first electronic key.

15. The method of claim 12, further comprising accessing a remote server to increase the license count stored on the first electronic key.

16. The method of claim 12, further comprising further comprising checking the data vault for a license at boot up of the gaming machine.

17. The method of claim 12, wherein the information stored in the first electronic key includes license expiration data for triggering the deactivation of installed software upon the expiration of the software license.

18. The method of claim 12, further comprising transferring the gaming software from a transport medium to the gaming machine.

19. The method of claim 12, further comprising downloading gaming software on to the gaming machine.

20. The method of claim 12, further comprising installing the downloaded software onto the gaming machine.

21. The method of claim 12, further comprising limiting the first electronic key for use with one or more specific gaming machines.

22. The method of claim 12, further comprising denying the installation of software onto the gaming machine.

23. A system for distributing gaming software licenses, the system comprising:

a gaming machine for playing electronic wagering games, the gaming machine comprising a main housing;

a first electronic key having a memory, a unique serial number and a SHA engine, the first electronic key storing information including an authentication secret and an encrypted license count indicating the number of software licenses available for authorizing the installation of gaming software onto the gaming machine, wherein the gaming software provides one or more games for play by a player;

a data vault positioned within the main housing of the gaming machine, the data vault being a secondary electronic key comprising a memory, a unique serial number and a SHA engine, wherein the data vault serves as a SHA coprocessor, and the data vault stores a system wide authentication secret;

an electronic key receptor operatively connected to the gaming machine, wherein the electronic key receptor is configured to interface with the first electronic key; and a main processor housed within the main housing of the gaming machine, wherein the main processor compares message authentication codes calculated from each of the data vault and the first electronic key to authenticate the first electronic key, and wherein the main processor accesses the information transmitted from the authenticated first electronic key, and if the license count is greater than zero, a license is distributed from the first electronic key to the data vault by decreasing the license count on the first electronic key by one and increasing the license count on the data vault by one.

24. The system of claim 23, wherein the main processor further comprises:

a retrieval component for accessing the encrypted license count when the first electronic key interfaces with the electronic key receptor;

a decryption component for deciphering the license count;

an evaluation component for evaluating the deciphered license count and determining whether a software license is available, and if a software license is available then transferring the software license to the gaming machine and decrementing the software count by one; and a re-encryption component for re-encrypting the decremented license count.

25. The system of claim 24, wherein the unique serial number of the first electronic key is a forty-eight-bit serial number.

26. The system of claim 24, wherein the memory of the first electronic key is a battery backed memory.

27. The system of claim 24, wherein the unique serial number of the data vault is a forty-eight-bit serial number.

28. The system of claim 24, wherein the memory of the first electronic key is a battery backed memory.

29. The system of claim 24, wherein the unique serial number of the first electronic key is a forty-eight-bit serial number, and the unique serial number of the data vault is a forty-eight-bit serial number.

30. The system of claim 23, wherein the first electronic key is limited for use with one or more specific gaming machines.

31. The system of claim 23, wherein the license information stored in the data vault is checked upon boot of the gaming machine.

32. The system of claim 23, further comprising a mechanism for downloading gaming software onto the gaming machine.

33. The system of claim 23, wherein the main processor accesses a remote server via a network connection and communicates with the first electronic key via the electronic key receptor.

34. The system of claim 23, further comprising a second processor, wherein the second processor accesses a remote server via a network connection and communicates with the first electronic key, the second processor being connected to the gaming machine.

35. The system of claim 34, wherein the second processor communicates with the first electronic key via the electronic key receptor.

36. The system of claim 34, wherein the second processor comprises a second electronic key receptor for communicating with the first electronic key.

37. The system of claim 23, further comprising a second processor, separate from the gaming machine, having a second key receptor for communicating with the first electronic key, wherein the second processor accesses a remote server via the network connection and the second processor is not connected the gaming machine.

38. The system of claim 23, wherein the license information stored in the data vault serves as an activation code to activate software installed on the gaming machine.

39. The system of claim 23, further comprises a transport medium operatively connected to the gaming machine for transferring gaming software to the gaming machine.

40. A method for distributing software licenses in a casino gaming system having one or more gaming machines, wherein one or more of the gaming machines has an electronic key receptor for interfacing with an electronic key and accessing information stored in the electronic key, the method comprising:

providing a first electronic key for interfacing with at least one gaming machine in the casino gaming system, the first electronic key having a memory, a unique serial number and a SHA engine;

providing at least one data vault housed within a gaming machine, wherein the data vault is a secondary electronic key comprising a memory, a unique serial number and a SHA engine, and wherein the data vault serves as a SHA coprocessor;

interfacing with a first electronic key via the electronic key receptor, wherein the first electronic key comprises a secret authentication code and information stored therein, and wherein the information includes a maximum license count value representing the maximum number of allowed software licenses and a running license count representing the number of software licenses used;

authenticating the first electronic key by requesting both the first electronic key and the data vault to each calculate message authentication codes and then comparing the calculated message authentication codes;

evaluating the running license count and the maximum license count value; and if the running license count is less than the maximum license count value, then distributing a license to the data vault by increasing the running license count by one, and increasing the license count in the data vault by one.

41. The method of claim 40, further comprising providing a processor for accessing a remote server and updating the information stored in the first electronic key to allow for the authorization of one or more additional software installations, wherein the processor communicates with the first electronic key via the electronic key receptor and the processor is connected to the remote server via a network connection.

42. The method of claim 40, further comprising downloading gaming software onto one or more gaming machine.

43. The method of claim 40, further comprising limiting the first electronic key for use with one or more specified gaming machines.

44. The method of claim 40, further comprising checking the data vault for a license at boot up of the gaming machine.

* * * * *